(12) United States Patent
Wagner

(10) Patent No.: US 7,024,880 B1
(45) Date of Patent: Apr. 11, 2006

(54) PORTABLE ICEMAKER AND METHOD FOR MAKING ICE

(75) Inventor: Anthony S. Wagner, Lakeway, TX (US)

(73) Assignee: Camp-Ice, Inc., Sherwood, AR (US)

( * ) Notice: Subject to any disclaimer, the term of this patent is extended or adjusted under 35 U.S.C. 154(b) by 0 days.

(21) Appl. No.: 10/858,768

(22) Filed: Jun. 2, 2004

Related U.S. Application Data

(60) Provisional application No. 60/475,159, filed on Jun. 2, 2003.

(51) Int. Cl.
*F25C 5/18* (2006.01)
*F25B 15/10* (2006.01)

(52) U.S. Cl. .................... 62/344; 62/490; 62/101
(58) Field of Classification Search .............. 62/101, 62/490, 457.9, 340, 344
See application file for complete search history.

(56) References Cited

U.S. PATENT DOCUMENTS

| | | | | |
|---|---|---|---|---|
| 3,146,608 A | * | 9/1964 | Carpenter | 62/293 |
| 3,321,932 A | * | 5/1967 | Orphey, Jr. | 62/340 |
| 3,534,563 A | * | 10/1970 | Ross | 62/222 |
| 4,922,730 A | * | 5/1990 | Schupbach et al. | 62/476 |
| 5,715,691 A | | 2/1998 | Wagner | |
| 5,878,595 A | * | 3/1999 | Wagner | 62/490 |
| 6,640,558 B1 | * | 11/2003 | Zenisek | 62/66 |

* cited by examiner

Primary Examiner—William C. Doerrler
(74) Attorney, Agent, or Firm—Russell D. Culbertson; The Culbertson Group, P.C.

(57) ABSTRACT

An icemaking apparatus includes an evaporator tube, a driving vessel charged with liquid ammonia and a driving gas, a heat source, a return system, and a target material reservoir adapted to be placed in an operating position over the evaporator tube. The evaporator tube has a heat transfer feature formed on and extending from a generally cylindrical outer evaporator tube surface. The heat source applies heat to the driving vessel to force liquid ammonia through an evaporator supply line to an expansion chamber inlet associated with the evaporator tube. The liquid ammonia goes to a gas as it enters the expansion chamber portion of the evaporator tube resulting in a transfer of heat from water or other target material contained in the target material reservoir secured over the evaporator tube in the operating position. The return system returns ammonia and hydrogen gas from the evaporator to the driving vessel.

19 Claims, 7 Drawing Sheets

PORTABLE ICEMAKER AND METHOD FOR MAKING ICE

CROSS-REFERENCE TO RELATED APPLICATION

This application is related to U.S. provisional patent application No. 60/475,159, filed Jun. 2, 2003, and entitled "Portable Icemaker and Method for Making Ice." The Applicant hereby claims the benefit of this provisional patent application under 35 U.S.C. § 119(e). The entire content of this provisional application is incorporated herein by this reference.

TECHNICAL FIELD OF THE INVENTION

This invention is directed to ice making systems. More particularly, the invention is related to portable ice making systems that can operate without an external energy source. The present invention encompasses icemaking devices and methods for making ice.

BACKGROUND OF THE INVENTION

It is sometimes desirable to have access to ice or an ice substitute such as a frozen gel refrigerant in remote locations far removed from an electrical power supply. It may be possible to transport ice to such a remote area, but transporting ice to a remote area may be impractical in many situations. Thus, it is desirable in some instances to have the capability of freezing water or some other target material at a remote location without the use of electrically powered refrigeration devices.

U.S. Pat. No. 5,715,691 and U.S. Pat. No. 5,878,595, to the present inventor, each discloses a refrigeration arrangement and process employing pressurized ammonia as a working fluid to produce ice using only a heat source and no external power. The entire content of each of these prior patents is incorporated herein by this reference. The present invention represents a further improvement on the apparatus and processes disclosed in these to earlier patents. In particular, the present invention provides for better heat transfer from water or other material being frozen.

SUMMARY OF THE INVENTION

The present invention provides both apparatus and methods for freezing water to make ice or freezing some other target material such as a suitable gel refrigerant material.

An apparatus according to the present invention includes an elongated evaporator tube, a driving vessel charged with liquid ammonia and a driving gas at an operating pressure and temperature, a heat source, a return system, and a target material reservoir adapted to be placed in an operating position over the evaporator tube. The elongated evaporator tube has a heat transfer feature formed on and extending from a generally cylindrical outer evaporator tube surface. The heat source is adapted to apply sufficient heat to the driving vessel to force liquid ammonia, generally together with some hydrogen gas through an evaporator supply line to an expansion chamber inlet associated with the evaporator tube. The liquid ammonia goes to a gas as it enters the expansion chamber portion of the evaporator tube resulting in a transfer of heat from the materials making up the evaporator tube and the heat transfer feature on the evaporator tube, and ultimately from the water or other target material contained in the target material reservoir secured over the evaporator tube in the operating position. According to the invention, the shape of the opening through the target material reservoir which receives the evaporator tube closely corresponds to the outer shape of the evaporator tube and the heat transfer feature to facilitate heat transfer from the target material to the mass of the evaporator tube. The return system facilitates the return of ammonia and hydrogen gas from an expansion chamber outlet of the evaporator to the driving vessel to complete the refrigerant circuit through the apparatus.

A method according to the present invention includes applying heat to a driving vessel charged with liquid ammonia and driving gas at atmospheric temperature and at an operating pressure. The method also includes enabling the liquid ammonia and driving gas to expand into an elongated evaporator tube to enable at least a portion of the liquid ammonia to go to a gaseous state. This phase change in the ammonia results in the transfer of heat ultimately from a target material within a target material reservoir to the mass of the evaporator tube and the heat transfer feature on the evaporator tube. The method also includes condensing the ammonia gas to a liquid state and returning the resulting liquid ammonia and driving gas to the driving vessel.

The heat transfer feature associated with the evaporator tube, together with the closely corresponding shape of the opening through the target material reservoir facilitates heat transfer from the target material in the reservoir and improves the freezing action provided by the apparatus and method. Heat transfer is further enhanced according to the invention by using a highly heat conductive base plate at a base of the evaporator tube which is adapted to contact a bottom surface of the target material reservoir when the reservoir is in the operating position on the evaporator tube.

These and other advantages and features of the invention will be apparent from the following description of the preferred embodiments, considered along with the accompanying drawings.

DESCRIPTION OF PREFERRED EMBODIMENTS

Figure 1:
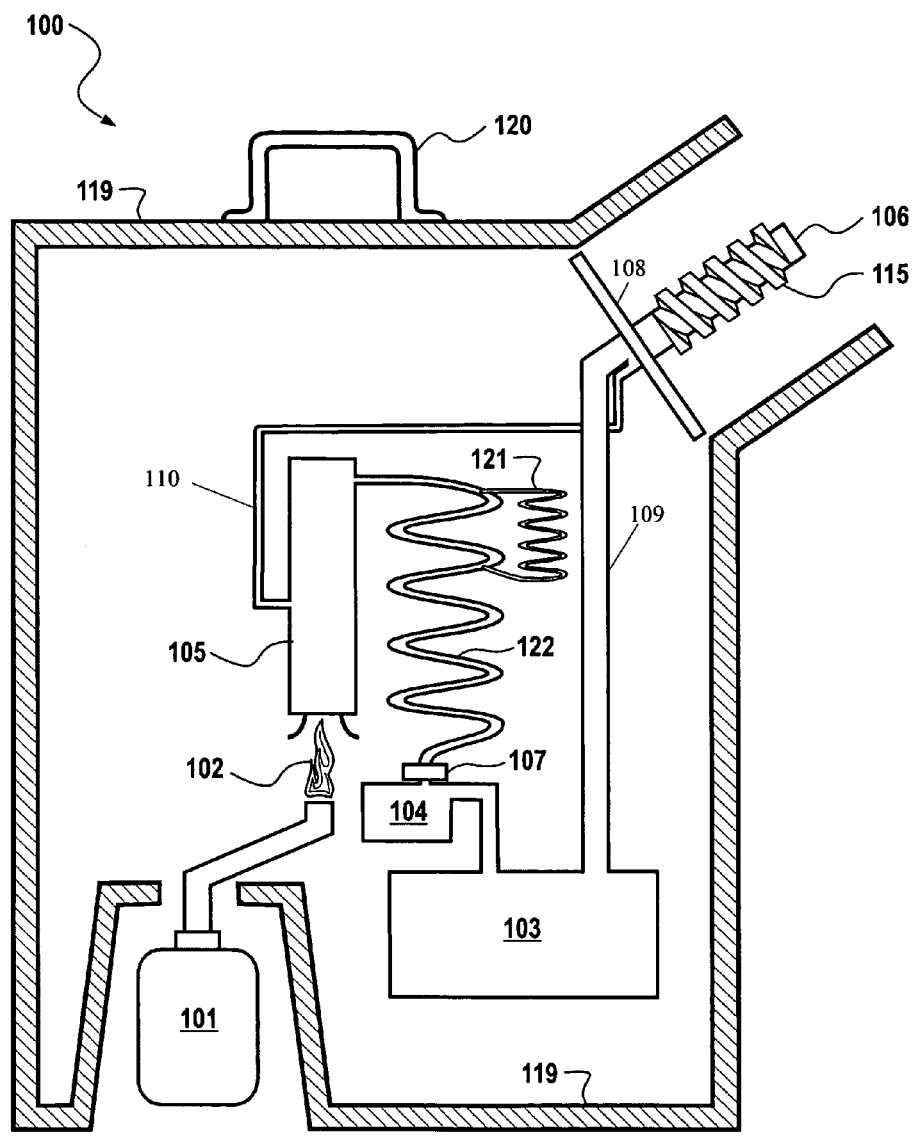
FIG. 1 is a diagrammatic representation of a portable ice maker embodying the principles of the present invention.
Figure 2:
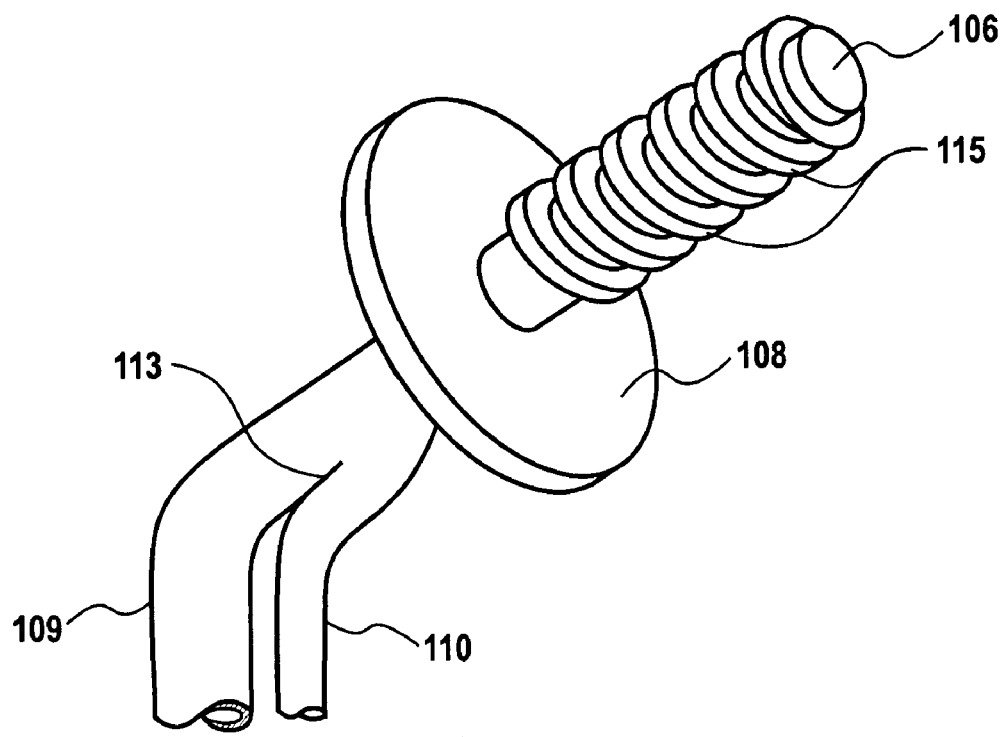
FIG. 2 is an isometric representation of an evaporator used in the icemaker shown in FIG. 1.

An apparatus 100 according to the present invention includes an enclosure 119 preferably made of a suitable plastic such as ABS, with a handle 120. Enclosure 119 encloses a heat source 102, a driving vessel 105, a condenser 121, a water separator 122, a flow restrictor 107, an absorber vessel 104, an ammonia/water mixture vessel 103, and an evaporator 106. These elements are operatively connected and serve the same functions as the corresponding elements set out in the incorporated patent disclosures, U.S. Pat. No. 5,715,691 and U.S. Pat. No. 5,878,595, noting that the present driving vessel 105 is referred to as a percolator in the prior patents. In particular, the apparatus is first charged with liquid ammonia or a strong ammonia solution with water in driving vessel 105, water or a relatively weak ammonia solution in vessel 103, and the system is pressurized to a suitable operating pressure with a suitable driving gas in the driving vessel. A suitable driving gas comprises hydrogen or some other gas which is substantially insoluble in water and liquid ammonia. Operating pressures may range from 325 psig or lower to 450 psig or higher. Operating temperature prior to the application of heat as described below may be any common atmospheric temperature from slightly above the freezing point of water to 100 or more degrees Fahrenheit.

As heat is applied to the charged driving vessel, a liquid ammonia line 110 feeds pressurized liquid ammonia and hydrogen gas from driving vessel 105 to an inlet of evaporator 106. The liquid ammonia goes to a gas as it enters evaporator 106 and a return system made up of return gas line 109, vessel 103, absorber vessel 104, flow restrictor 107, water separator 122 and condenser 121, carries hydrogen gas and ammonia from evaporator 106 back to driving vessel 105. The illustrated preferred heat source 102 comprises a burning fuel supplied from fuel source 101 to a suitable burner, and the energy from the burning fuel provides the driving force to drive liquid ammonia refrigerant and hydrogen gas from driving vessel 105 to evaporator 106. It is noted that the layout of elements shown in FIG. 1 is only diagrammatic and is not intended to represent the actual position of the various elements in the enclosure 119. In particular, elements 103, 104, 107, 122, and 121 are preferably mounted with respect to driving vessel 105 to facilitate the return of ammonia hydrogen to driving vessel 105 under the force of gravity, that is, by gravity separation.

When the apparatus 100 is initially charged it is preferably charged with a solution of approximately 28% aqueous ammonia in sufficient volume to completely fill driving vessel 105 and approximately one-half of vessel 103. Then the apparatus is pressurized with the driving gas to the desired initial charge or operating pressure. The apparatus may then be initialized according to the process described in U.S. Pat. No. 5,878,595, by applying the heat source 102, removing excess liquid, and then recharging with the driving gas to the desired operating pressure.

Figure 6:
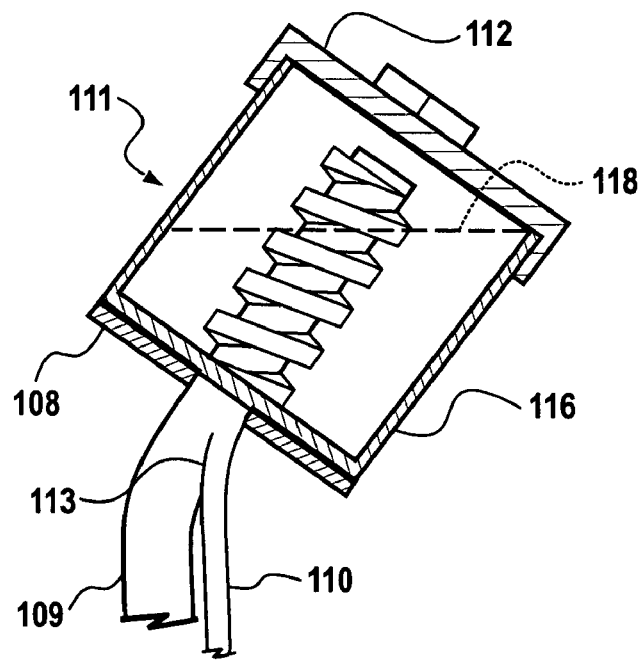
FIG. 6 is a partial longitudinal section view through the reservoir as shown in FIG. 5.
Figure 7:
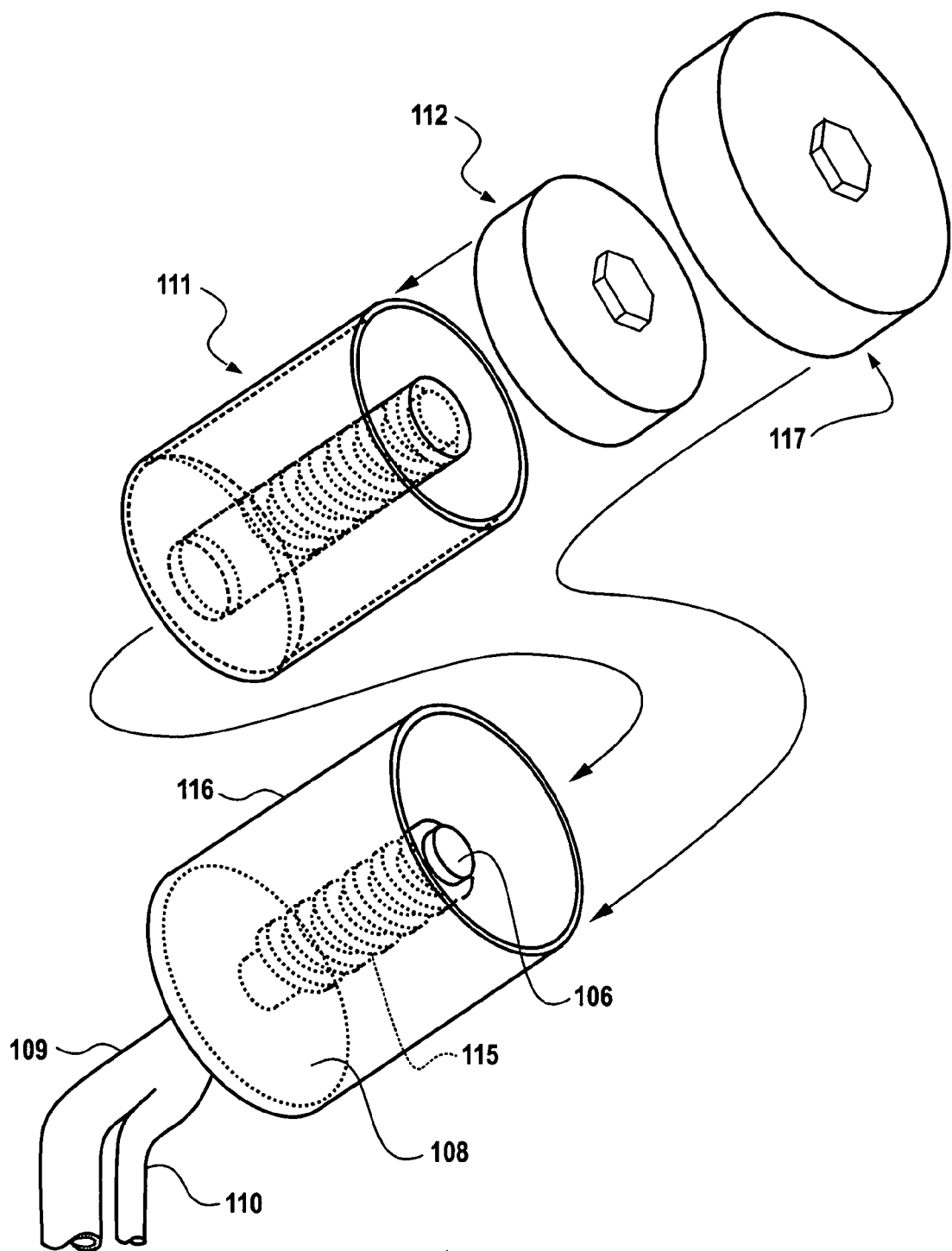
FIG. 7 is an exploded isometric view of the evaporator and reservoir together with an exterior container/heat sink and exterior lid.

The preferred evaporator 106 shown in FIGS. 1 through 9 includes a highly heat conductive base plate 108 connected at a proximal end of the evaporator. A target material container or reservoir 111 shown in FIGS. 4 through 9 is adapted to be positioned in a working or operating position shown especially in FIG. 6 over the evaporator 106 above base plate 108. Evaporator 106 shown in FIGS. 1 through 9 includes a generally cylindrical outer surface on which is formed a helical ridge 115 which forms essentially a thread that runs along a substantial portion of the length of the evaporator. This helical ridge 115 comprises a heat transfer feature for evaporator 106 in this particular form of the invention. Target material container 111 includes a central opening 160 which includes a surface having a helical groove 161 matching the helical ridge or threads 115, so that the target material container can be threaded onto evaporator 106 over helical ridge or threads 115. A lid 112 fits over the distal end of target material container 111 to enclose the container as shown in FIG. 6, and may be secured with a threaded connection to container 111, a press fit connection or any other suitable connection. Where the target material held in container or reservoir 111 comprises a gel refrigerant or other similar functioning material, the container may be permanently sealed rather than having a removable lid as shown.

The helical ridge or thread 115 and closely corresponding opening 160 through container/reservoir 111, including helical groove 161, facilitate heat transfer between evaporator 106 and the contents of target material container/reservoir 111. The arrangement of helical ridge 115 and corresponding helical groove 161 also helps retain container/reservoir 111 in the operating position shown in FIG. 6 with the bottom or proximal end of the container/reservoir abutting base plate 108. The exterior walls of target material container/reservoir 111 are preferably made from an insulating material while the material forming inner opening 160 and corresponding helical groove 161 is made of a thin and/or highly heat conductive material for facilitating heat transfer between the evaporator 106 and target material held in the container/reservoir. The target material in container/reservoir 111 is shown to fill line 118 in FIGS. 6 and 9.

Figure 8:
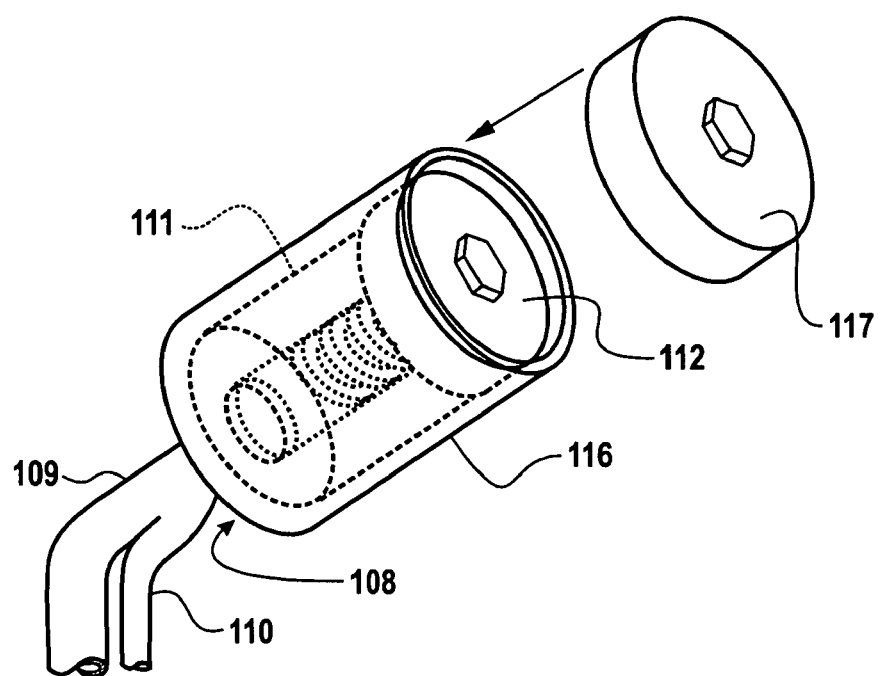
FIG. 8 is an isometric view of the exterior container shown in FIG. 7 connected over the reservoir on the evaporator.
Figure 9:
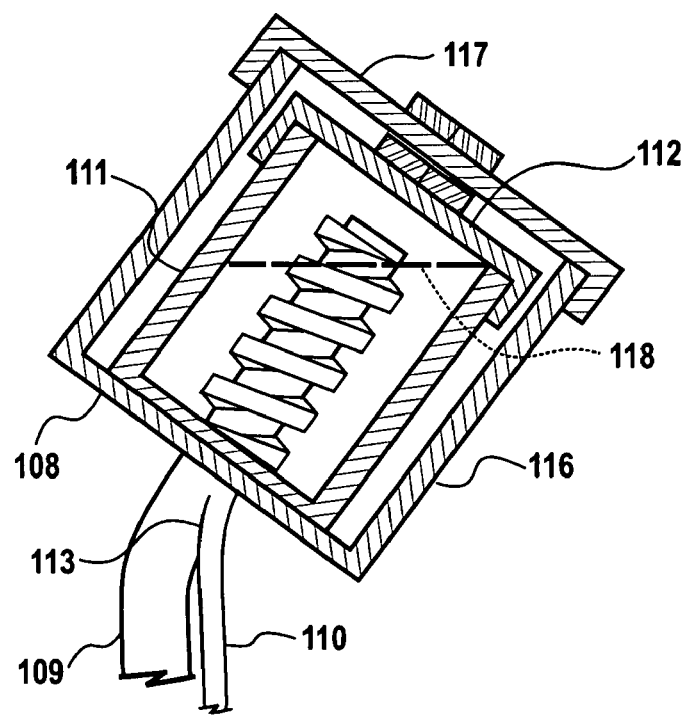
FIG. 9 is a partial longitudinal section view through the evaporator, reservoir, and exterior container.

As shown in FIGS. 8 and 9, base plate 108 preferably forms the base of an enclosure defined by walls 116 and including enclosure lid 117. Walls 116 and lid 117 are preferably formed from a suitable insulating material to form an insulating enclosure within which container/reservoir 111 is mounted in the operating position over evaporator 106.

Figure 3:
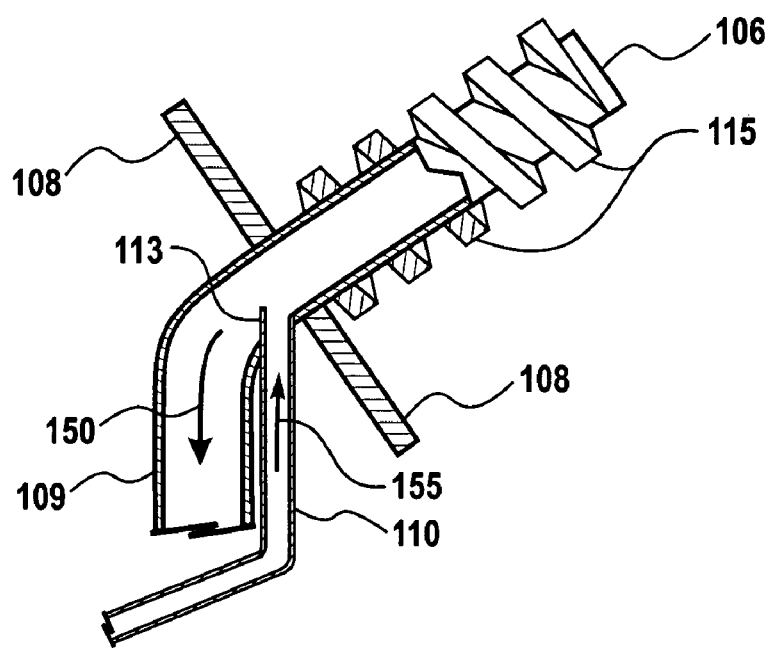
FIG. 3 is a partial section view of the evaporator shown in FIG. 2.
Figure 4:
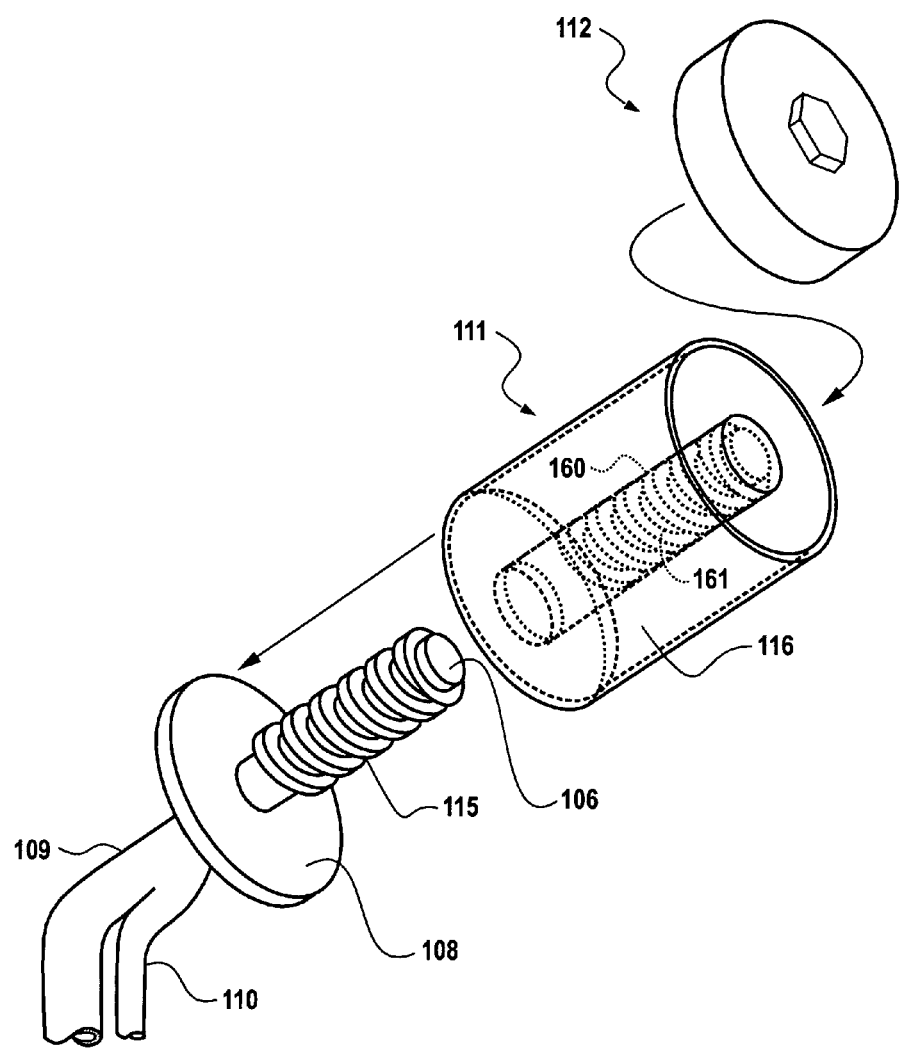
FIG. 4 is an exploded isometric view of the evaporator shown in FIG. 2 and a water/ice reservoir to be connected over the evaporator.
Figure 5:
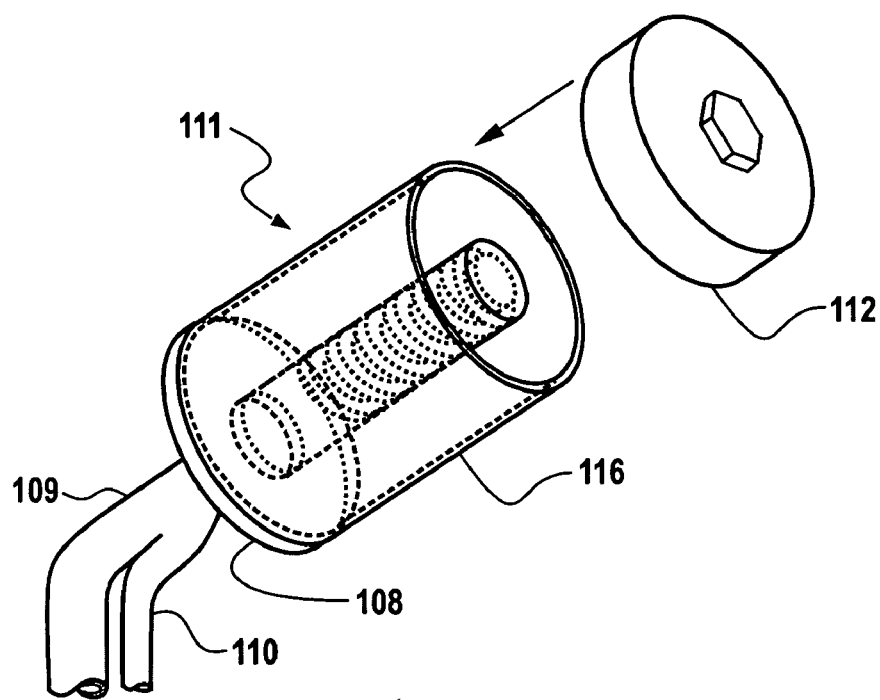
FIG. 5 is an isometric view of the evaporator shown in FIG. 2 with the reservoir shown in FIG. 4 in the attached working position.

FIG. 3 shows the circulation of fluids in evaporator 106. Liquid ammonia and hydrogen gas under pressure are forced up into evaporator 106 through line 110 as indicated by arrow 155. As the ammonia flows into an expansion chamber portion of evaporator 106 past the end 113 of conduit 110, the ammonia goes to a gaseous state. The change of state absorbs heat through the walls of evaporator 106 and ultimately from the target material held in container/reservoir 111. Gaseous ammonia and hydrogen gas exit evaporator 106 through an expansion chamber outlet associated with the evaporator to gas return line 109 as indicated by arrow 150.

Figure 10:
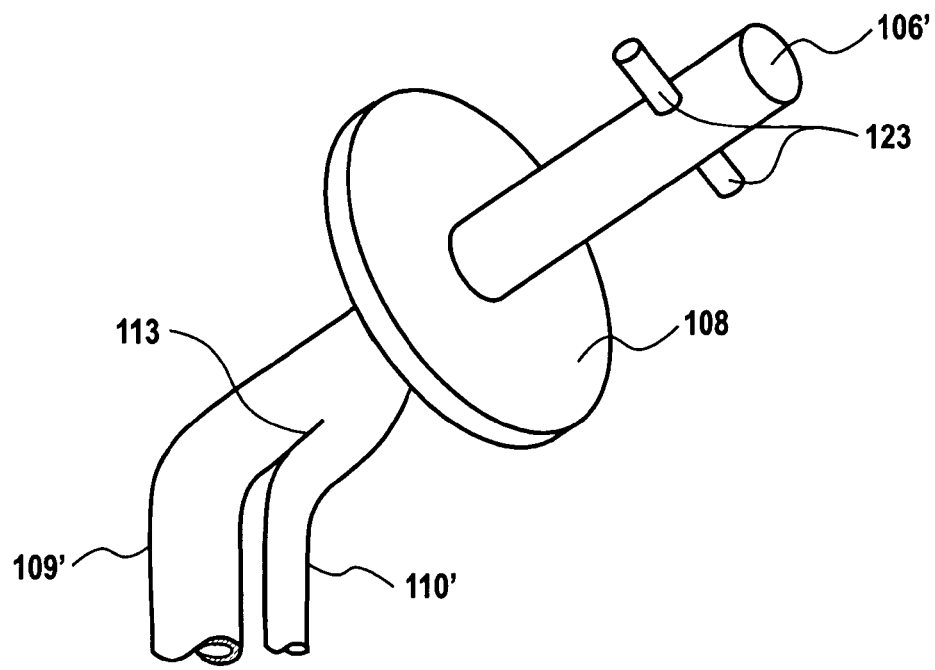
FIG. 10 is an isometric view of an alternate evaporator according to the invention.
Figure 11:
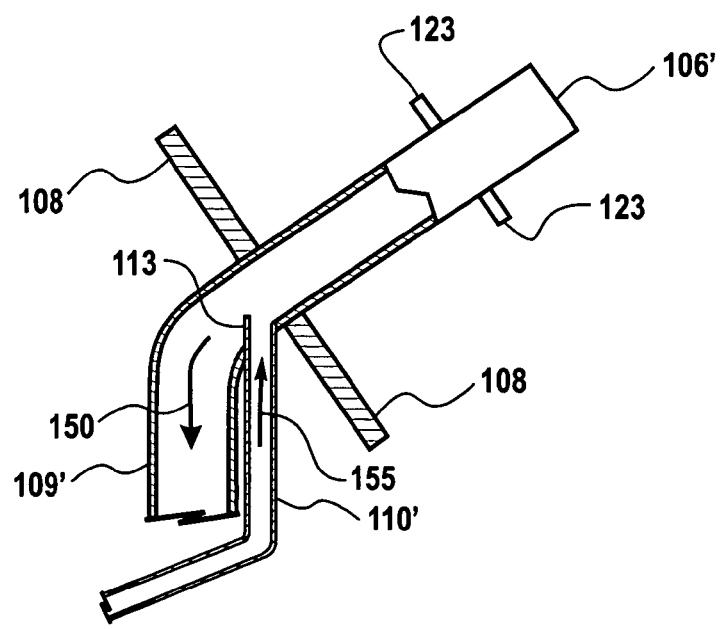
FIG. 11 is a partial longitudinal section view through the evaporator shown in FIG. 10.

FIGS. 10 and 11 illustrate an alternate evaporator 106' having a similar internal structure to evaporator 106 shown in FIGS. 1 through 9, but with a different heat transfer feature. In evaporator 106' shown in FIGS. 10 and 11, liquid ammonia and hydrogen gas under pressure are forced through line 110' as indicated by arrow 155'. Gaseous ammonia and hydrogen gas exit the chamber formed by evaporator 106' through exit line 109'. Unlike the heat transfer feature comprising the spiral or helical ridge or thread 115 shown in evaporator 106, however, evaporator 106' includes a heat transfer feature comprising one or more studs or projections 123. These projections 123 are each adapted to cooperate with a J or L slot on an inner opening of a target material container/reservoir (not shown) adapted to fit in an operating position over evaporator 106'. The target material container used with evaporator 106' is similar to container 111 shown in FIG. 4, with the exception that the inner opening 160 shown in FIG. 4 does not include the helical groove, but rather an L or J slot groove that allows the container to slide onto evaporator 106' in FIGS. 10 and 11 to an operating position similar to the position shown in FIG. 6, and then be twisted or rotated appropriately to secure the container in the operating position.

The above described preferred embodiments are intended to illustrate the principles of the invention, but not to limit the scope of the invention. Various other embodiments and modifications to these preferred embodiments may be made by those skilled in the art without departing from the scope of the invention. In particular, although ammonia is described as the preferred refrigerant and hydrogen gas as the preferred pressurizing or driving gas, other refrigerants and pressurizing gasses may be used according to the present invention.

What is claimed is:

1. An apparatus including:
   (a) an elongated evaporator tube having a generally cylindrical outer surface with a heat transfer feature formed thereon, the heat transfer feature including a projection extending from the outer surface of the evaporator tube;
   (b) a driving vessel charged with liquid ammonia and a driving gas at an operating pressure and temperature;
   (c) a heat source adapted to apply sufficient heat to the driving vessel to force liquid ammonia through an evaporator supply line to an expansion chamber inlet associated with the evaporator tube;
   (d) a return system facilitating the return of ammonia from an expansion chamber outlet of the evaporator tube to the driving vessel; and
   (e) a target material reservoir having a central opening extending there through, the central opening having a first portion with a size and shape closely corresponding to the cylindrical outer surface of the evaporator tube, and also having a second portion comprising an elongated slot having a shape closely corresponding to an outer surface of the projection.

2. The apparatus of claim 1 wherein the heat transfer feature comprises a helical ridge extending from the cylindrical outer surface of the evaporator tube and wherein the second portion of the target material reservoir central opening includes a helical slot corresponding to the helical ridge so as to be threadable over the helical ridge.

3. The apparatus of claim 2 further including an insulating enclosure surrounding lateral sides and distal end of the target material reservoir when the target material reservoir is in an operating position received over the evaporator tube.

4. The apparatus of claim 1 further including a heat conductive base extending in a plane transverse to the longitudinal axis of the evaporator tube, and wherein the target material reservoir is adapted to substantially abut the heat conductive base when the target material reservoir is in an operating position received over the evaporator tube.

5. The apparatus of claim 1 further including a housing surrounding the heat source, driving vessel, and return system.

6. The apparatus of claim 1 wherein the return system includes a water and ammonia mixture reservoir connected to an evaporator outlet line, an absorber vessel connected to receive fluid from the water and ammonia mixture reservoir, a flow restrictor, an ammonia separator connected between the absorber vessel and the driving vessel, and an ammonia condenser associated with the ammonia separator.

7. The apparatus of claim 1 wherein the first portion of the target material reservoir central opening corresponds closely in shape to the cylindrical outer surface of the evaporator tube and the second portion of the target material reservoir central opening comprises a J-shaped or L-shaped slot.

8. A method including the steps of:
   (a) applying heat to a driving vessel charged with liquid ammonia and driving gas at atmospheric temperature and at an operating pressure;
   (b) enabling the liquid ammonia and driving gas to expand into an elongated evaporator tube to enable at least a portion of the liquid ammonia to go to a gaseous state;
   (c) transferring heat to a cylindrical outer surface of the evaporator tube and a heat transfer feature on the evaporator tube from a target material within a target material reservoir, the target material reservoir having a cavity therein with a first portion having a size and shape closely corresponding to the cylindrical outer surface of the evaporator tube and having a second portion comprising an elongated slot having a shape closely corresponding to an outer surface of the heat transfer feature, and the target material reservoir being positioned in an operating position in which the evaporator tube extends through the target material reservoir cavity and the heat transfer feature extends into the slot; and
   (d) condensing the ammonia gas to a liquid state and returning the resulting liquid ammonia and driving gas to the driving vessel.

9. The method of claim 8 wherein the heat transfer feature comprises a helical ridge and the elongated slot making up the second portion of the target material reservoir comprises a helical slot corresponding to the helical ridge, and further including the step of threading the evaporator tube and helical ridge into the cavity in the target material reservoir to place the target material reservoir in the operating position.

10. The method of claim 9 further including the step of transferring heat to a base plate from a bottom surface of the target material reservoir, the base plate extending transverse to the longitudinal axis of the evaporator tube.

11. The method of claim 8 further including the step of securing the target material reservoir over the evaporator tube by cooperation between the heat transfer feature the slot in the target material reservoir cavity.

12. The method of claim 11 further including the step of transferring heat to a base plate from a bottom surface of the target material reservoir, the base plate extending transverse to the longitudinal axis of the evaporator tube.

13. The method of claim 8 wherein the operating pressure is a pressure between approximately 325 psig and 450 psig and the operating temperature is an atmospheric temperature.

14. The method of claim 8 wherein the step of applying heat to the driving vessel includes applying heat from the combustion of a fuel.

15. The method of claim 8 further including the step of directing ammonia gas and driving gas from the evaporator tube to a water/ammonia mixture vessel.

16. An apparatus including:
   (a) an elongated evaporator tube having a generally cylindrical outer surface with a helical ridge formed thereon;
   (b) a driving vessel charged with liquid ammonia and a driving gas at an operating pressure and temperature;
   (c) a heat source adapted to apply sufficient heat to the driving vessel to force liquid ammonia through an evaporator supply line to an expansion chamber inlet associated with the evaporator tube;

(d) a return system facilitating the return of ammonia from an expansion chamber outlet of the evaporator tube to the driving vessel; and (e) a target material reservoir having a central opening extending there through, the central opening having a size and shape closely corresponding to the cylindrical outer surface and heat transfer feature of the evaporator, and also having a helical portion corresponding to the helical ridge so as to be threadable over the helical ridge.

17. An apparatus including:

(a) an elongated evaporator tube having a generally cylindrical outer surface with a heat transfer feature formed thereon, the heat transfer feature comprising a projection extending from the cylindrical outer surface of the evaporator tube;

(b) a driving vessel charged with liquid ammonia and a driving gas at an operating pressure and temperature;

(c) a heat source adapted to apply sufficient heat to the driving vessel to force liquid ammonia through an evaporator supply line to an expansion chamber inlet associated with the evaporator tube;

(d) a return system facilitating the return of ammonia from an expansion chamber outlet of the evaporator tube to the driving vessel; and (e) a target material reservoir having a central opening extending there through, the central opening having a size and shape closely corresponding to the cylindrical outer surface of the evaporator tube and having a J-shaped or L-shaped slot formed therein to closely receive the projection extending from the cylindrical outer surface of the evaporator tube.

18. A method including the steps of:

(a) applying heat to a driving vessel charged with liquid ammonia and driving gas at atmospheric temperature and at an operating pressure;

(b) enabling the liquid ammonia and driving gas to expand into an elongated evaporator tube to enable at least a portion of the liquid ammonia to go to a gaseous state;

(c) transferring heat to the outer surface of the evaporator tube and a heat transfer feature from a target material in a target material reservoir when the target material reservoir is in an operating position with respect to the evaporator tube and heat transfer feature, the heat transfer feature comprising a helical ridge on the evaporator tube;

(d) condensing the ammonia gas to a liquid state and returning the resulting liquid ammonia and driving gas to the driving vessel; and (e) threading the evaporator tube and helical ridge into a corresponding helical grooved passage through the target material reservoir to place the target material reservoir in the operating position.

19. A method including the steps of:

(a) applying heat to a driving vessel charged with liquid ammonia and driving gas at atmospheric temperature and at an operating pressure;

(b) enabling the liquid ammonia and driving gas to expand into an elongated evaporator tube to enable at least a portion of the liquid ammonia to go to a gaseous state;

(c) transferring heat to the outer surface of the evaporator tube and a heat transfer feature on the evaporator tube from a target material within a target material reservoir, the reservoir being in an operating position closely surrounding the evaporator tube and heat transfer feature;

(d) condensing the ammonia gas to a liquid state and returning the resulting liquid ammonia and driving gas to the driving vessel; and (e) securing the target material reservoir over the evaporator tube by cooperation between a projection from the evaporator tube and a projection receiving slot in the target material reservoir and wherein the heat transfer feature comprises the projection from the evaporator tube.

* * * * *